US008891901B2

(12) United States Patent
Conlon

(10) Patent No.: US 8,891,901 B2
(45) Date of Patent: *Nov. 18, 2014

(54) SYSTEMS AND METHODS FOR IMPLEMENTING USER-CUSTOMIZABLE OPERABILITY FOR IMAGING OPERATIONS IN IMAGE FORMING DEVICES

(75) Inventor: Paul Roberts Conlon, South Bristol, NY (US)

(73) Assignee: Xerox Corporation, Norwalk, CT (US)

( * ) Notice: Subject to any disclaimer, the term of this patent is extended or adjusted under 35 U.S.C. 154(b) by 365 days.

This patent is subject to a terminal disclaimer.

(21) Appl. No.: 13/420,157

(22) Filed: Mar. 14, 2012

(65) Prior Publication Data
US 2013/0242322 A1    Sep. 19, 2013

(51) Int. Cl.
*G06K 9/36*    (2006.01)
(52) U.S. Cl.
USPC .......................................................... 382/276
(58) Field of Classification Search
None
See application file for complete search history.

(56) References Cited

U.S. PATENT DOCUMENTS

| 2007/0168401 | A1* | 7/2007 | Kapoor et al. ................ 707/202 |
| 2007/0279676 | A1* | 12/2007 | Garg ........................... 358/1.15 |
| 2007/0288412 | A1* | 12/2007 | Linehan ........................ 706/45 |
| 2011/0050595 | A1* | 3/2011 | Lundback et al. ............ 345/173 |
| 2011/0055729 | A1* | 3/2011 | Mason et al. ................. 715/753 |
| 2011/0109919 | A1* | 5/2011 | Conlon et al. ................ 358/1.2 |
| 2012/0314230 | A1* | 12/2012 | Conlon ......................... 358/1.9 |

OTHER PUBLICATIONS

Paul Roberts Conlon; U.S. Appl. No. 13/155,756, filed Jun. 8, 2011, entitled Frame-Based Coordinate Space Transformations of Graphical Image Data in an Image Processing System.
Paul Roberts Conlon; U.S. Appl. No. 13/155,723, filed Jun. 8, 2011, entitled Image Operations Using Frame-Based Coordinate Space Transformations of Image Data in a Digital Imaging System.

* cited by examiner

*Primary Examiner* — Jingge Wu
(74) *Attorney, Agent, or Firm* — Ronald E. Prass, Jr.; Prass LLP

(57) ABSTRACT

A system and method are provided by which a user can operate any particular image forming device in a manner that emulates any other particular image forming device. These systems and methods decouple the user from a device-specified origin, or device-specified order of operations, by affording the user an opportunity, at a graphical user interface of an image forming device, to pick an origin and an order of operations that the user desires be undertaken by the image forming device. An ability to pick which origins and orders of operations the user desires allows for establishment of a policy for image forming operations in multiple different image forming devices. The user can define the order of operations when the user walks up to the machine. Otherwise, a system administrator may set up a particular user desired origin and order of operations as a system policy to convert printing job tickets.

16 Claims, 4 Drawing Sheets

SYSTEMS AND METHODS FOR IMPLEMENTING USER-CUSTOMIZABLE OPERABILITY FOR IMAGING OPERATIONS IN IMAGE FORMING DEVICES

This application is related to U.S. patent application Ser. No. 13/155,756, filed Jun. 8, 2011, entitled "Frame-Based Coordinate Space Transformations Of Graphical Image Data In An Image Processing System," published as U.S. Patent Application Publication No. 2012/0314229 A1 and U.S. patent application Ser. No. 13/155,723, filed Jun. 8, 2011, entitled "Image Operations Using Frame-Based Coordinate Space Transformations Of Image Data In A Digital Imaging System," issued as U.S. Pat. No. 8,564,832 on Oct. 22, 2013. These applications are co-owned by the Assignee of this application. The disclosures of the related applications are hereby incorporated by reference herein in their entirety.

BACKGROUND

1. Field of Disclosed Subject Matter

This disclosure relates to systems and methods for implementing user-customizable operability for imaging operations in image forming devices.

2. Related Art

Office level image forming devices combine image forming processes and associated media handling and finishing processes in a single device. What is not clear to the common user is that any particular imaging task or job requested by the user to be carried out by the office level image forming device includes multiple individual imaging operations each according to specified orthogonal orientations. Different imaging devices behave differently with regard to these individual imaging operations. The differing behaviors can occur across imaging devices from a same manufacturer, or across like devices produced by differing vendors.

An exemplary and non-exhaustive list of individual imaging operations includes scaling or sizing, translation or image shift, mirroring or reflecting, and rotation of images in two dimensions and of image receiving media in three dimensions. These operations are generally specifically ordered for a particular image forming device. Individual image forming operations are non-commutative. Thus, differing orders of the operations manipulate an input image receiving media in different ways. As such, certain manipulation of the order of the operations, including adding additional steps, is often undertaken to produce a repeatable output based on an ordering of the operations. This manipulation can make the outcome of the operations repeatable for a particular device. Any change in an order of operations, however, as a set of transformations, will typically result in a different output unless modified in some manner that may or may not be available to the system designer and/or programmer. Frequently, it is only through an extensive iterative trial and error process that a user will get an imaging job to run as desired to produce, for example, the desired output orientation for an imaged and finished document on a particular device and this effort is not translatable to another device.

An example of an image forming device that exhibits the characteristic behaviors discussed above is a multi-function device (MFD). The MFD is an office level or light production image forming and media handling device that incorporates multiple common image forming and media handling functionalities including printing, scanning, faxing, viewing and copying. MFDs provide a smaller footprint in an office environment than would a combination of individual devices that individually carry out the respective image forming functions.

As is mentioned briefly above, conventionally, imaging operations, and an order of the imaging operations, such as rotation, scaling, and translation, are generally fixed within a device. These operations are generally fixed relative to a specific operation origin, and in a specific orientation (along specified axes of operations) with respect to that origin. Since such operations are non-commutative, order is significant when performing more than one operation. However, the ordering of the operations is often implicit and therefore unobvious to a user. Vendors often build the imaging hardware and then place a user interface on top of the hardware by which the user is able to communicate with the image processing system in a limited manner, but by which the user is unable to effect any change in an order of operations in the underlying hardware, or to specify a different origin, or axes of operations, from which imaging operations should take place.

The above difficulties can be compounded based on conventional approaches to programming schemes for office level devices that inconsistently characterize orientations of images and image receiving media. Rather than characterizing imaging orientations according to any common and manipulable mathematical framework, descriptive terms (or enumerations), such as "faceup" or "facedown," and "inboard" or "outboard," among others, are used to describe directions. These descriptive terms may be generally understood and tracked in the context of a particular image forming device. Interpretation of these descriptive terms, however, between different devices, particularly those of different manufacturers, tends to be inconsistent and therefore haphazard. The descriptive terms are often not consistent across devices and manufacturers as variations in the descriptive terms may be employed by individual manufacturers, or applied to individual devices leading to difficulties in interpretation between different devices. In other words, different words may be used to describe the same or similar operations, thereby leading to interpretational difficulties. Even if consistent descriptive terms are used, the points of origin for the operations and directions in which the operations are undertaken (orthogonal orientations) may differ between devices and between manufacturers. Many times devices or fleets of devices, even when produced by a same manufacturer, use different origin points and/or coordinate references as a basis by which to interpret the descriptive labels for the orientations of images and image receiving media in individual devices. Without a common frame of reference, the descriptive terms are left to the interpretation of the individual devices according to individual device frames of reference as individual devices carry out electronic image scanning and processing functions as well as mechanical image media handling and finishing functions.

In a broad context, overall imaging operations such as device specific scaling, translation, reflection, rotation and edge erase are individually undertaken relative to a particular coordinate space referenced to a particular origin for a particular device that may be completely different from another coordinate space referenced to another origin for another device. The coordinate spaces and origins by which a particular image forming device references image and image receiving media orientations can differ from device to device.

As indicated above, origins, directions of execution (axes of operations) and orders of particular internal operations are often fixed for each individual image forming device. Conventionally, the user cannot generally select a different origin, i.e., a particular corner, the center, or an arbitrary point in the imaging frame, different axes of orientations or a different order of operations for a particular device. The user cannot generally specify a different direction of rotation, or a different edge about which image media is to be flipped from, for example, a faceup to a facedown orientation.

The point at which the above difficulties may particularly manifest themselves is when the user enters a competitive environment. The user would prefer to approach any of the differing, apparently similar, devices and operate them in the same manner to achieve repeatable outcomes. Depending on a particular origin that is referenced by a particular system, the manner by which the sheet flows through the particular system, and how the platens and/or rulers are set up in the particular system, ordering of particular operations will likely result in an output from that particular system that differs from an output from another system, much to the customer dissatisfaction.

This difficulty also manifests itself in the formulation of job tickets for image forming operations across differing office level devices. Because a particular order of operations is non-commutative, a job ticket formulated for one device, which is run on a separate device, may result in an output that is not in accordance with the user's desires.

SUMMARY OF THE DISCLOSED EMBODIMENTS

In view of the above-identified shortfalls in conventional image forming devices, previous research by the inventor of the subject matter of this disclosure has defined a common framework for representation of image origins and coordinate spaces across multiple devices. See, e.g., co-owned U.S. patent application Ser. No. 13/155,756, entitled "Frame-Based Coordinate Space Transformations Of Graphical Image Data In An Image Processing System" and Ser. No. 13/155,723, entitled "Image Operations Using Frame-Based Coordinate Space Transformations Of Image Data In A Digital Imaging System."

In a three-dimensional system, there is a set of forty-eight definable coordinate systems that represent all of the possible orthogonal orientations for image receiving media in an image forming device. (Note that imaging in an MFD typically occurs in a two-dimensional coordinate system. In the two-dimensional system, there is a set of eight definable coordinate systems that may simply be considered a subset of the set of forty-eight definable three-dimensional coordinate systems in which Z is consistently set to zero). In actuality, one of the forty-eight variations represents the standard Cartesian coordinate system, and the other forty-seven variations are deviations from that standard. For ease of interpretation, and to avoid confusion, this disclosure will refer to the available set of coordinate systems as "the forty-eight coordinate systems." This set of forty-eight coordinate systems is based on the existence of six sets of XYZ orientations that can be mapped to each of the eight corners of a cube representing the three-dimensional system. These forty-eight coordinate systems can, in turn, be mathematically represented according to a corresponding set of forty-eight individual mathematical representations to respectively identify each of the coordinate systems.

Examples of limited numbers of the above-described mathematical representations are presented in the above-identified co-owned U.S. patent applications. FIGS. 1A and 1B illustrate an example correspondence between a visual representation of a three-dimensional coordinate system 100 and a corresponding mathematical representation 150 according to this inventor's previous work as a foundation for the disclosed systems and methods. As shown in FIG. 1A, the coordinate system may be visually represented as having an origin 110 from which orthogonal axes, X-axis 120, Y-axis 130 and Z-axis 140 emanate. The origin 110 could be any one of the eight corners of the depicted cube. Varying combinations of the axes will emanate from each of those origins resulting collectively in the forty-eight non-standard coordinate systems discussed above. A mathematical representation 150, in a mathematical matrix format as shown in FIG. 1B, may be assigned to each of the forty-eight non-standard coordinate systems. The assignment of mathematical representations, in a mathematical matrix format, as shown, facilitates combining program operations (transformations) using matrix algebra as a processing medium for the systems and methods according to this disclosure. It should be noted that the specific mathematical representations shown in FIG. 1B, and in the referenced documents, are only examples of the mathematical representation matrices that could be employed to define each of the forty-eight non-standard coordinate systems. Those of skill in the art of image forming systems and mathematics will recognize that a particular three-dimensional coordinate system can be represented in a number of different ways mathematically in the form of a numerical matrix.

Regardless of their construct, the corresponding set of forty-eight individual mathematical representations, when taken together, define a mathematical group under the operations of rotation and reflection. With the forty-eight coordinate systems being defined or represented mathematically, matrix algebra is applied in manipulation of the individual mathematical transformations to rotate or reflect the orthogonal orientations represented by the coordinate systems to different ones of the forty-eight possible orientations. Each resultant orientation is a member of the mathematical group. Any series of multiple operations applied to a beginning orientation necessarily results in an ending orientation that is defined as one of the orientations in the group.

An advantage of finding a common definition or interpretation for the multiple non-standard coordinate systems, as they are applied to differing image forming devices is that individual orientations of images and image receiving media between differing image forming devices can be unambiguously expressed and manipulated according to the common mathematical framework. Coordination can then be effected between operations in differing devices according to a user's desires. Application of the mathematical framework provides a capability by which the effects of changes that are made in an order of imaging operations can be accurately predicted and evaluated, obviating the requirement for conventional complex trial and error processes in order to achieve or maintain the desired output from any particular image forming device. The derived mathematical framework facilitates a level of automation and precision that was previously unavailable to system designers and/or programmers.

The above-referenced prior work of the inventor of the subject matter of this application described image and image receiving media orthogonal orientations using the group of forty-eight coordinate systems (or orthogonal orientation matrices). The solution presented in that previous work was limited to generating the specified set of mathematical representations forming the mathematical group that could then be manipulated using matrix algebra principles to provide an example of a common mathematical framework for interpreting the orthogonal orientations of images and image receiving media in image forming devices in a manner that is device and/or vendor agnostic.

What that work further provided, and was limited to, was a system and method for transforming graphics coordinates between different models of image processing systems. Using the method previously disclosed, a user could readily configure an image forming device to receive image data from a device platen in a first coordinate space and map the received data to a second coordinate space for subsequent processing independent of whether the two coordinate spaces share the same origins. Implementations were provided that enable a user to configure an image processing system to transform image data to any desired processing orientation.

It would be advantageous in view of the above-identified previous work in orientation tracking to provide a system and method that would combine the orientation approaches described above with reference to this inventor's previous work with existing algorithmic approaches to provide a user with a mechanism by which to cause a particular image forming device to appear to operate generically according to the user's desires based on user manipulation at, for example, graphical user interface (GUI).

Exemplary embodiments may employ concepts related to emulation processing to make the outputs from respective different image forming devices look the same according to user-specified inputs. Emulation processing generally provides an opportunity by which to address hardware differences with a software overlay. In this regard, emulation processing essentially makes separate sets of hardware modules appear to operate consistently to a user. For example, when a user chooses to scale up an image, the software processes the request such that the output may be made to appear the same to the user regardless of the underlying hardware. Emulation processing, therefore, is intended to provide common outputs across a broad spectrum of image forming devices that are differently constructed according to their underlying hardware components. The emulation processing must address not only differing origins, but also must address differing axes of operations and orders of operations which are, as indicated above, non-commutative.

The previous disclosures focus on specific emulations, and frame-based methods for implementing those emulations, but stop short of identifying a mechanism for specific user interaction to define an origin, a set of axes of operations and an order of operations in order to direct the repeatable outcome.

Exemplary embodiments may enable application of orientation algorithms to provide a flexible, user customizable set of imaging operation behaviors by allowing a user to explicitly order imaging operations in any desired order, and according to a specific origin, and/or a specified set of axes of operations in a particular image for device. User-directed reordering may be accomplished via commonly-understood drag-and-drop operability given specially-adapted user interfaces by which to accomplish these functions.

Exemplary embodiments may provide the user a mechanism by which to select a different origin by visually choosing and designating a new corner in a graphical representation of an image receiving medium operated on by the image forming device presented on, for example, a graphical user interface of the image forming device.

In exemplary embodiments, as ordering of operations or origins are changed by the user, previously selected numerical values such as, for example, for scaling an image may be automatically recalculated and applied.

Exemplary embodiments may provide a mechanism for special handling of job tickets. Calculations of transformations may be undertaken and applied to the job tickets in order to modify the operations represented by the job tickets in a manner that is decoupled from any particular device at defines, for example, an origin, a set of axes of operations and an order of operations to be undertaken by the image forming device that executes the job ticket.

Exemplary embodiments may implement calculating mathematical representations that characterize the operations (transformations) needed to map from the original parameters for a specific image forming device to the target parameters chosen by the user based on input made by the user via a graphical user interface of the image forming device. Other exemplary embodiments may implement calculating via an image forming utility executed on, for example, a separate computer workstation. Either of these implementations affords the user the opportunity to interactively undertake a visual setup, which may be automatically converted to a mathematical representation in order that, regardless of device, a common interpretation of the instructions provided by the user is implemented. The computer workstation-based implementation may translate the visual setup automatically to convert, for example, a large number of existing job tickets for from one format directed at a particular device to another format directed to a different device. Formats can be proprietary, or according to an industry standard. The disclosed mapping schemes may aid in commonly describing any combination of formats to, for example, aid in converting legacy formats to an industry standard format, or to consume a standard format and map it to internal ways of doing things within a device.

Exemplary embodiments may implement the above concepts in a practical manner that "makes those ideas work" on any particular image forming device by focusing on the user operability to make the system work and by specifying how the system looks to the user, and what the mechanism is for user interaction.

Exemplary embodiments may bypass the inherent coordinate space built into each of the hardware and/or the software for particular image formed device by decoupling the user's experience from the specifics of the software or the hardware construct including origins and directions of operations that are programmed into the particular image forming device. In other words, operation of a particular image forming device is decoupled from being defined by the underlying hardware, or software in a manner that is manipulable by user interaction via the user interface.

Exemplary embodiments may provide the user a scheme by which to operate any particular image forming device in a manner that emulates any other particular image forming device. The user can specify an origin and axes of operations emanating from the user-selected origin. For example, users tend to be comfortable with X being a spanwise or horizontal axis, and Y being a lengthwise axis orthogonal to the "X axis" in the plane of the platen for image forming devices. This need not be the case. According to the disclosed embodiments, the user may select axes of operations for the system to operate in the manner of the user's choosing. The user can also define the order of operations. In embodiments, the user may also be afforded an opportunity to independently select a direction of rotation for operations in the particular image forming device. The user can accomplish this at a point where the user walks up to the machine. Otherwise, a system administrator may set up a particular user desired origin in order of operations as a system policy.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing user-customizable operability for imaging operations in image forming devices will be described, in detail, with reference to the following drawings, in which.

DETAILED DESCRIPTION OF THE DISCLOSED EMBODIMENTS

Figures 1A, 1B:
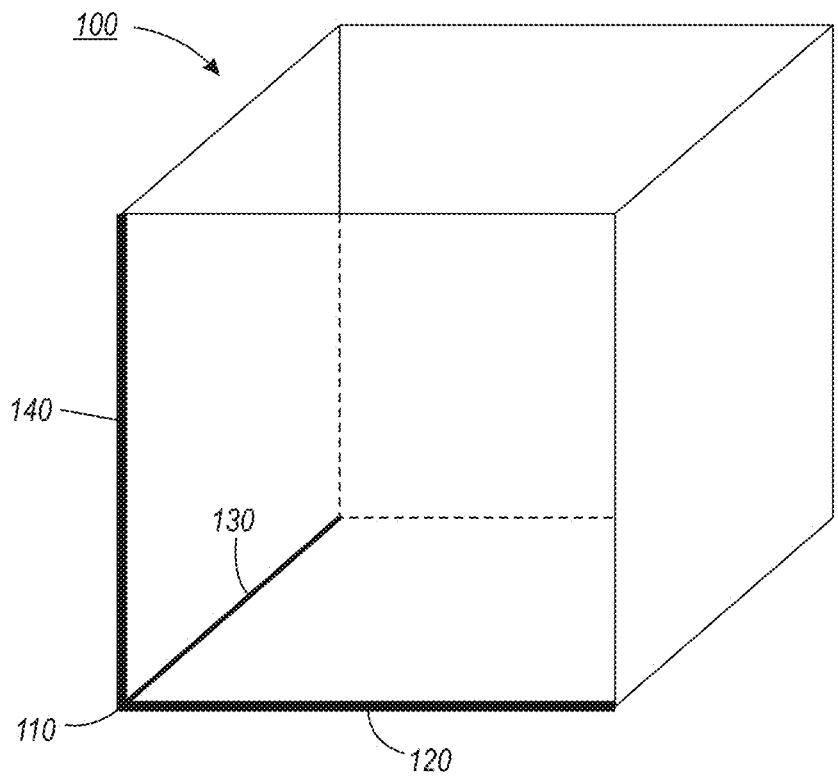
FIGS. 1A and 1B illustrate an example correspondence between a visual representation of a three-dimensional coordinate system and a corresponding mathematical representation according to this inventor's previous work as a foundation for the disclosed systems and methods.

The systems and methods for implementing user-customizable operability for imaging operations in image forming devices according to this disclosure will generally refer to this specific combination of utilities or functions for those systems and methods. Exemplary embodiments described and depicted in this disclosure should not be interpreted as being specifically limited to any particular image forming device configuration, including to any particular configuration graphical user interface associated with any particular image forming device, or configuration of any computing device that may be employed in support of the image forming device. No particular set of mathematical representations associated with a set of coordinate spaces (or orthogonal orientations) in two or three dimensions is implied nor is any particular programming language or scheme implicated. Additionally, the systems and methods according to disclosure should not be interpreted as being specifically directed to any particular intended use. Any methodology for controlling operations in an image forming device that may benefit from the disclosed systems and methods is contemplated.

Specific reference to, for example, an image forming device throughout this disclosure should not be considered as being limited to any particular type of image forming device including, for example, any of a printer, a copier or a multi-function device. The term "image forming device," as referenced throughout this disclosure is intended to refer globally to virtually any device or system that includes various capabilities for electronic image processing and/or image receiving media handling, including feeding and finishing, that generally (1) receives an image from an image source and an image receiving medium from an image receiving medium source, (2) registers the image on the image receiving medium and (3) finishes the image forming process by mechanically moving the image receiving medium to an output receptacle, optionally via some form of finisher such as, for example, a stapling device.

The systems and methods according to this disclosure will be described as being particularly adaptable to use multi-function devices (MFDs), but the systems and methods according to this disclosure should not be considered as being limited by any particular combination of image processing and/or media handling component operations in an individual device.

Imaging operations may be controlled by a Graphical User Interface (GUI) on an image forming device, or otherwise by the user interaction with remote workstation that replaces, or augments, the functions of the GUI. When composite operations occur, the ordering and origin are significant to the output product, but there is nothing inherent in the conventional GUI, or other user interface, to explicitly show the ordering. Further, the ordering varies based on the particular device hardware and internal image paths through the particular device. To decouple the user experience from the underlying hardware behavior, a GUI according to this disclosure is reconfigured to provide the user with flexibility to describe how the operations will proceed according to user input, and to provide explicit clarity as to actual underlying ordering.

The disclosed systems and methods allow the user to walk up to the image forming device and specify the origin and the order of operations. So, for example, given a particular image processing card inside a printer, the image processing card will assist in accomplishing an image shift and/or a rotation and/or scaling, as appropriate. To the extent, however, that it is the software, or the hardware, that is assisting the user in accomplishing a particular task, the software or the hardware must reference a particular origin, and undertake specific operations in particular directions with respect to those origins. As such, the user's selections may be used to override the inherent coordinate space built into the hardware and/or the software of the image forming device. In other words, the user's experience may be decoupled from the specifics of the software or the hardware construct including origins and directions of operations that is programmed into the particular image forming device.

The user is free to select which origins, axes of operations and order of operations the user desires. An ability to pick which origins and order of operations the user desires is useful because such user desires can be used, for example, to establish a policy. For example, when a user enters a competitive environment among multiple image processing device vendors, and the user wants systems to operate similarly in a vendor agnostic manner, the user's desires in this regard can be easily accommodated.

In a currently-deployed office MFD, the "Copy" screen displayed on the GUI may provide options for the user to select "Reduce/Enlarge" and/or "Rotate Side 2," for example, on a top level screen or page. However, to perform an image shift, the user may need to navigate via a lower level screen on the GUI as, for example, a Layout Adjustment tab to present an "Image Shift" icon. Selecting the "Image Shift" icon then may bring the user to a screen to specify shift amounts. All of these operations are origin-dependent. For instance, scaling is relative to the particular origin. In instances, for example, where a "Copy/Scan" platen origin is different from an "RIP" (e.g., PostScript) origin, scaling produces different behaviors in a scan path versus a print path.

The disclosed GUI co-locates imaging operations on a single screen of the GUI, or one closely-related screens in a manner not previously undertaken. The disclosed GUI adds customizable graphics specifically directed at allowing a user to select an origin and a list box of operations that can be re-ordered via a common drag-and-drop paradigm using, for example, either a cursor or a hand icon to select the origin, and the order of operations. When selected, the origin can be highlighted in order that the user is presented visual feedback regarding the user's selection.

Figure 2:
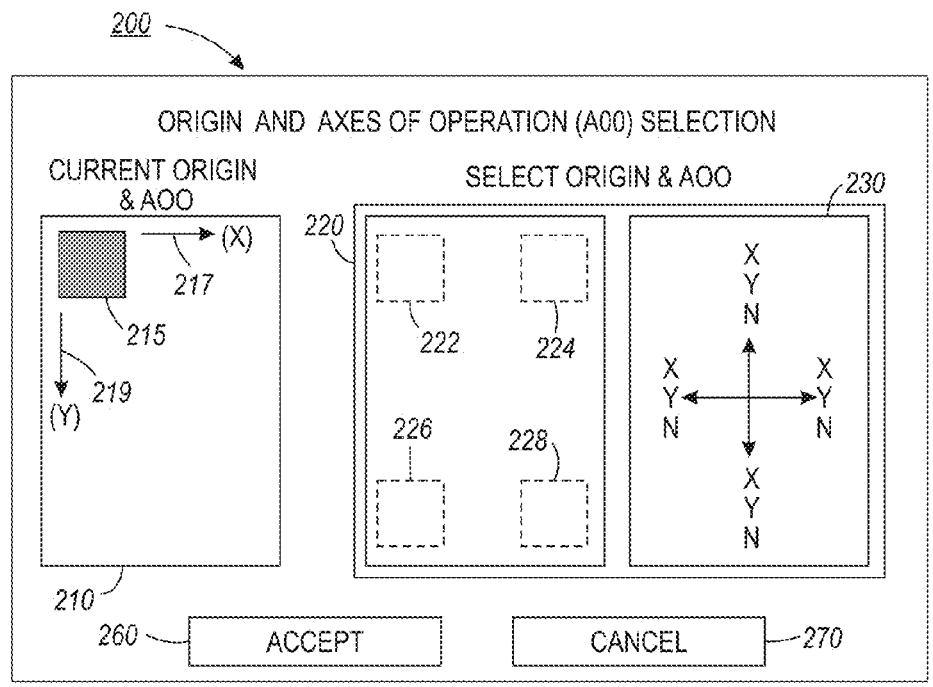
FIG. 2 illustrates an exemplary configuration for a first page of a user-interactive display for implementing the systems and methods according to this disclosure.
Figure 3:
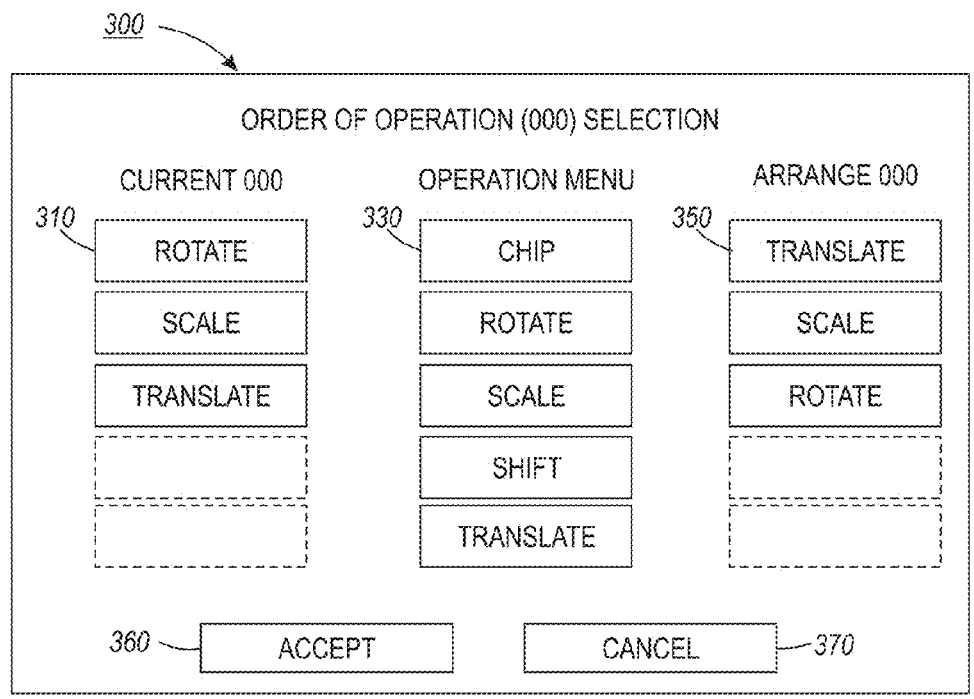
FIG. 3 illustrates an exemplary configuration of a second page of a user-interactive display for implementing the systems and methods according to this disclosure.

FIG. 2 illustrates an exemplary configuration for a first page of a user-interactive display 200 for implementing the systems and methods according to this disclosure. The user-interactive display 200 may be incorporated in a GUI associated with a particular image forming device, or may otherwise be available on a display user workstation communicating with an image forming device. It should be noted that, in a preferred embodiment, the first page of the user-interactive display shown in FIG. 2 would be combined in a single display with the second page of the user-interactive display shown in FIG. 3. It should be noted that the exemplary depiction of the display shown in each of FIGS. 2 and 3 is exemplary only in order to clarify the disclosed subject matter. No specific configuration to the display should be imputed to the illustrations of exemplary embodiments in either of FIG. 2 or 3.

As shown in FIG. 2, the first page 200 of the user-interactive display may provide the user with an option to select a specific origin for imaging operations and axes of operations for those imaging operations in the image forming device with which the user-interactive display is associated. As a portion of the specified origin selection screen, an indication 210 of a current origin 215, and of current axes of operation 217,219, emanating from the current origin 215, associated with an outline of a generic image receiving medium may be displayed. A user may be afforded an option in the same indication, or otherwise in a separate indication 220 as shown, to select, for example, a same or differing origin by moving a cursor to, or otherwise highlighting with, for example, a screen that supports gestures, one of several fields 222-228 to represent a separate origin that the user desires to select. The user may also be afforded an option in the same indication, or otherwise in a separate indication field 230 as shown, to select, for example, same or differing axes of operations for association with the separate origin that the user has selected. In the exemplary embodiment shown in FIG. 2, the user may be afforded an opportunity, for example, to identify each of four axes specified by the arrows shown in element 230 in FIG. 2 as corresponding to a chosen "X" axis, "Y" axis, and a non-selected or non-operating, "N" axis. It should be recognized that the format for selection of either operating origins, or axes of operations, may take on many different embodiments involving many different static or interactive depictions. Additionally, although not specifically depicted in FIG. 2, like depictions may be included to afford the user an opportunity to select a direction of rotation for operations in the image forming device with which the user-interactive display is associated. Finally, options may be provided for the user to "Accept" 260 or "Cancel" 270 a particular selection of an updated origin.

FIG. 3 illustrates an exemplary configuration of a second page 300 of a user-interactive display for implementing the systems and methods according to this disclosure. As shown in FIG. 3, the user may be afforded an opportunity to select an order of operations. As with the display in FIG. 2, this page of the user-interactive display may be configured in any manner that facilitates user interaction for the specified purpose.

This page 300 of the user-interactive display may include an indication 310 of a current order of the operations. A separate indication 330 may provide a listing of available operations from which a user may select to populate, for example, a third indication 350 of the user's arrangement of the specified order of operations. A user's selections of individual operations and placing those individual operations in a specified order may be made by moving a cursor to, or otherwise highlighting with, for example, a touchscreen, one of several operations listed in the separate indication 330 of the available operations. Otherwise, the user may be afforded a mechanism by which to drag-and-drop a differing order of operations according to the user's desires. As with the screen presented in FIG. 2, options may be provided for the user to "Accept" 360 or "Cancel" 370 a particular selection of an updated order of operations.

With reference to FIG. 3, it should be noted that the Rotate operation is defined first in the first indication 310 of the current order of operations. The Rotate operation may be chosen by a user to be moved to the last position in the order of operations, as shown in the additional indication 350 of the user-selected ordering of the operations. In this manner, the ordering is manipulated by the user to change the specified order from Rotate, then Scale, then Translate to Translate, then Scale, then Rotate by simply dragging the imaging operations into a new and different ordering.

Transparent to the user then, if any actual values have been entered by the user, such as, for example, values regarding an amount of shift, these values would be automatically updated with the correct values for the new ordering, to achieve the same result. The same would apply to the origin, so for example, the shift value from one origin to the closest corner would be different than a different origin to the new closest corner. Regardless of the changes input by the user via the disclosed user interface, it should be recognized that the values will be automatically updated to be correct for the newly-defined operability.

The user can specify an origin. The user can specify axes of operations. The user can define the order of operations. The user can accomplish this at a point where the user walks up to the machine. Otherwise, a system administrator may set up a particular user-desired origin and order of operations as a system policy.

In this manner, operation of a particular image forming device is decoupled from being defined by the underlying hardware or software and is manipulable by user interaction via the user interface. The manner in which the device behaves is modified according to a user's desires with an objective of making the user experience with one machine replicate that of the user experience with another machine.

Another advantage is that the job tickets can be submitted, particularly in an instance where the functions shown above are undertaken by a user at a user workstation, and updated to specifically identify origins and orders of operations in a manner that achieves commonality between operations undertaken in different devices. An advantage here is that for multiple operations, an order can be specified to ensure that the outcome is repeatable according to user's desires across different classes and vendors of image forming devices.

For ticket translation from one device to the other, a side-by-side listing of the current selections and user-requested selections could allow for simultaneous viewing of a current behavior (non-editable) and a range of visual selections for a new behavior (define needed mapping attributes for directing the hardware functioning of the device, otherwise referred to as "under the hood"). This functionality may be appended as an extension to another visual ticket editor, or may be presented as a standalone functionality.

Unique concepts embodied in this disclosure include an ability to extend the performance of image forming device emulation discussed in this inventor's earlier work. These concepts are specifically directed at a simple implementation for operability in an office level image forming device. By manipulating a user interface in the manner disclosed, a user is afforded an opportunity to remove the implicit fixed operability resident in a particular image forming device making operations for the image forming device explicit and simply customizable according to a user's desires. An advantage of the disclosed system is that it enables mapping of job tickets from one device to another in terms of imaging operations.

Figure 4:
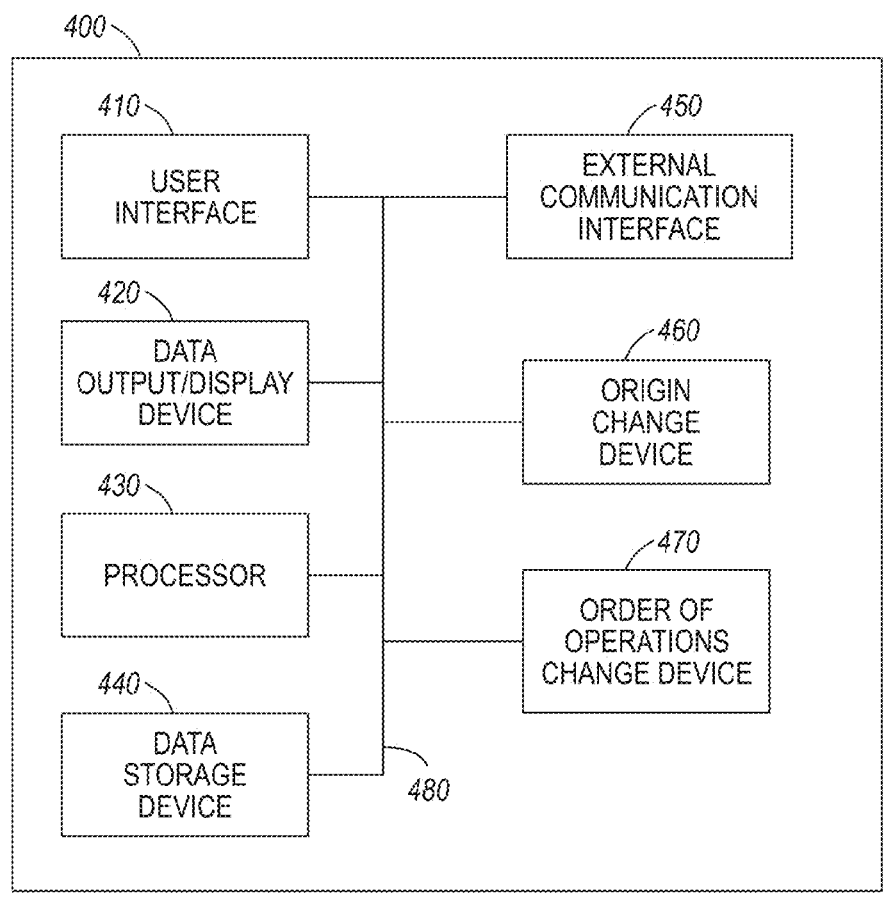
FIG. 4 illustrates a block diagram of an exemplary system for implementing user-customizable operability for imaging operations in image forming devices according to this disclosure.

FIG. 4 illustrates a block diagram of an exemplary system 400 for implementing user-customizable operability for imaging operations in image forming devices according to this disclosure. The exemplary system 400 may be a component of a particular image forming device. Otherwise, the exemplary system 400 may be a standalone system apart from, but in wired or wireless communication with, an image forming device.

The exemplary system 400 may include a user interface 410 by which a user may communicate with the exemplary system 400. The user interface 410 may be configured as one or more conventional mechanisms common to computing devices such as, for example, a user's workstation that permit the user to input information to the exemplary system 400. The user interface 410 may be associated with an integral display capability of a data/display device 420 as components of a GUI in the image forming device. In such an embodiment, the user interface 410 may include, for example, some manner of touchscreen with "soft" buttons, or with various components for use with a compatible stylus, by which the user may be able to specify functions as discussed above, by touching specific regions of the touchscreen, or by dragging and dropping displayed icons on the touchscreen. Otherwise, the user interface 410 may be associated with a separate data output/display device 420 as part of a user workstation and may include, for example, a conventional keyboard and mouse, or a microphone by which a user may provide oral commands to the exemplary system 400 to be "translated" by a voice recognition program. Despite the location, or configuration, of the user interface 410, it is intended to encompass a medium by which a user may communicate specific operating instructions to the exemplary system 400.

The user interface 410 may be specifically employed in the context of this disclosure as a medium by which to specify a different origin, or a different order of operations, to be employed by an image forming device in executing an image forming function according to a user's desires. See, e.g., the depictions and accompanying descriptions regarding FIGS. 2 and 3 above.

The exemplary system 400 may include a data output/display device 420 that may display information regarding user inputs provided via the user interface 410 as well as information regarding the functioning of the exemplary system 400. The data output/display device 420 may be used to display any manner of visual or graphical depiction that will facilitate user interaction with an image forming device according to the systems and methods of this disclosure. Specifically, user-selectable options for designating a specific origin, or order of operations, may be presented to the user for selection.

The data output/display device 420 may comprise any conventional means by which to display relevant data regarding the functioning of the exemplary system 400, and may provide the user, in conjunction with the user interface 410, a means to interactively communicate with, and control, the functions undertaken by the exemplary system 400. As indicated above, the data output/display device 420 may be co-located with the user interface 410 as components of a GUI in the image forming device with which the exemplary system 400 may be associated.

The exemplary system 400 may include one or more local processors 430 for individually operating the exemplary system 400 and carrying out specific portions of data retrieval and inherent reordering functions of the exemplary system 400. Processor(s) 430 may include at least one conventional processor or microprocessor and may comprise, for example, a Graphics Processing Unit (GPU) or a Central Processing Unit (CPU) as those terms are understood by one of skill in the art, that may be provided to interpret and execute instructions in cooperation with other system components for executing the disclosed processing scheme for modification of behavior of an image forming device based on user inputs made via a user interface 410. The processor(s) 430 may take inputs received via the user interface 410 and reset an origin or order of operations by which the image forming device conducts image processing functions according to a user's desires.

The exemplary system 400 may include one or more data storage devices 440 to store relevant data, and/or such operating programs as may be used by the exemplary system 400, and specifically the processor(s) 430 to carry into effect the resetting of origins and reordering of operations according to the user's desires in the manner disclosed. At least one data storage device 440 may be designated to store mathematical representations of operations (transformations) executable by a specific image forming device with which the exemplary system 400 is in communication. These stored mathematical representations may be referenced by the processor(s) 430 when they user-specified re-ordering of operations is directed to modify the software overlay in a manner that executes the user's desired operating scheme in a device agnostic manner.

Data storage device(s) 440 may include a random access memory (RAM) or another type of dynamic storage device that is capable of storing collected information, and separately of storing instructions for execution of system operations by, for example, processor(s) 430. Data storage device(s) 440 may also include a read-only memory (ROM), which may include a conventional ROM device or another type of static storage device that stores static information and instructions for processor(s) 430.

The exemplary system 400 may include one or more external data communication interfaces 450. The one or more external data communication interface(s) 450 may be particularly relevant in instances where the exemplary system 400 is displaced from, and in communication with, an image forming device with which the exemplary system 400 is associated. In such instances, the external data communication interfaces 450 may be provided to facilitate wired or wireless communication between the exemplary system 400 and the one or more image forming devices with which the exemplary system 400 may be associated.

The exemplary system 400 may include an origin change device 460 that may be specifically employed by the exemplary system 400 to, for example, receive a user-indicated origin that is different from an origin used by an image forming device. The origin change device 460, autonomously, or in cooperation with the processor(s) 430 and/or the data storage device 440, may mathematically represent a coordinate system defined by the user-indicated origin and apply a transformation to the mathematical representation of the user-indicated origin that converts reference to the user-indicated origin to a reference origin programmed into the image forming device with which the exemplary system 400 is associated. In this manner, the user is able to present an input image to the image forming device according to the user-indicated origin in the origin change device 460 provides the mechanism whereby an output from the image forming device is produced according to a user's desires regardless of the user-indicated origin.

The exemplary system 400 may include an order of operations change device 470 that may be specifically employed by the exemplary system 400 to, for example, receive a user-indicated order of operations that is different from an order of operations used by an image forming device. The order of operations change device 470, autonomously, or in cooperation with the processor(s) 430 and/or the data storage device 440, may mathematically represent a transformation according to an order of operations specified by the user-indicated order of operations and apply a transformation to the mathematical representation of the user-indicated order of operations that converts a device-specific order of operations to the user-indicated order of operations in the image forming device with which the exemplary system 400 is associated. In this manner, the user is able to present an input image to the image forming device and have that input image acted upon according to the user-indicated order of operations based on transformations undertaken by the order of operations change device 470. The user is thus provided a mechanism whereby an output from the image forming device is produced according to a user's desires regardless of the user-indicated order of operations.

All of the various components of the exemplary system 400, as depicted in FIG. 4, may be connected by one or more data/control busses 480. These data/control busses 480 may provide wired or wireless communication between the various components of the exemplary system 400 regardless of whether those components are housed within, for example, a single computing device as a component of an image forming device, a single computing device in communication with an image forming device, or individual ones of the depicted components are housed independently.

It should be appreciated that, although depicted in FIG. 4 as what appears to be an integral unit, the various disclosed elements of the exemplary system 400 may be arranged in any combination of sub-systems as individual components or combinations of components, integral to a single unit, or as separate components housed in one or more of a user workstation, an image forming device, or otherwise in some device, associated with one or more image forming devices. Therefore, no specific configuration for the exemplary system 400 is to be implied by the depiction in FIG. 4.

Figure 5:
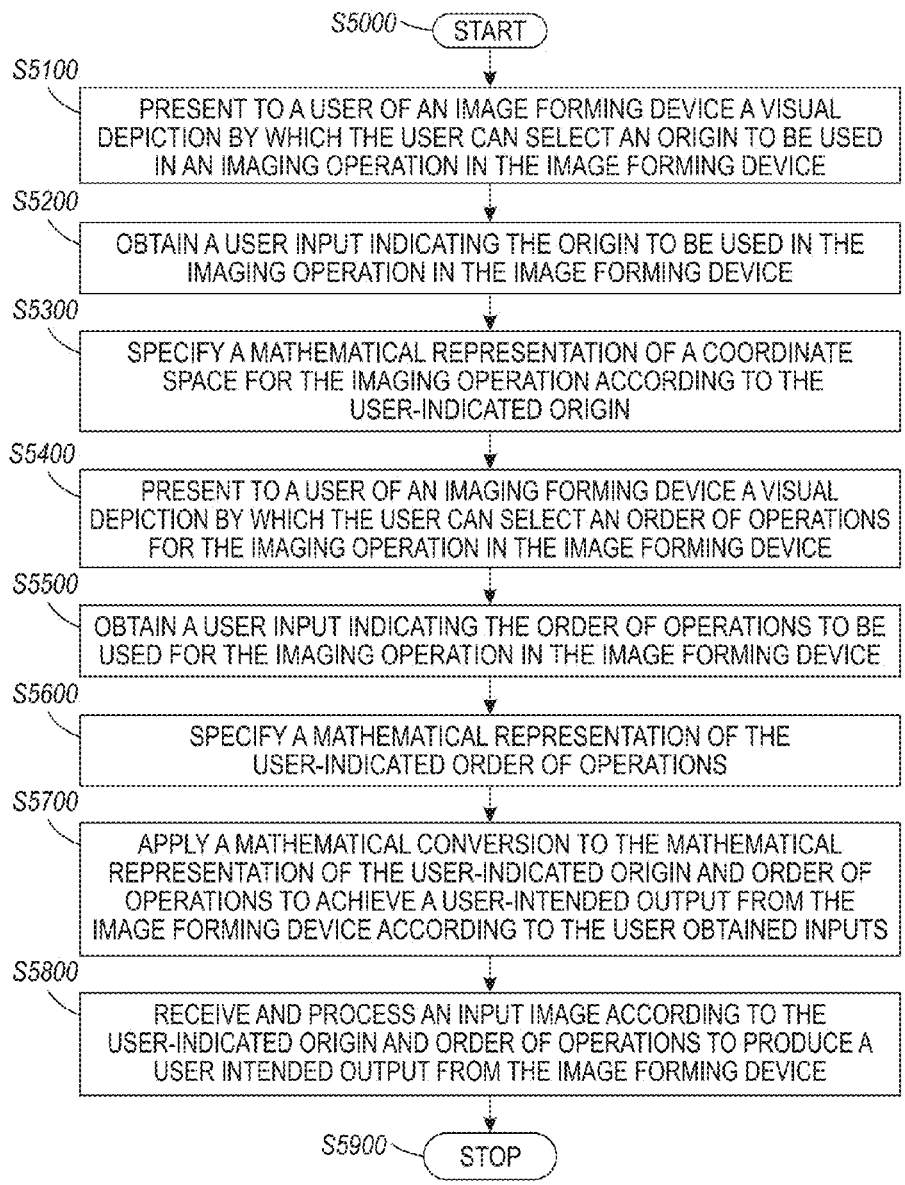
FIG. 5 illustrates a flowchart of an exemplary method for implementing user-customizable operability for imaging operations in image forming devices according to this disclosure.

The disclosed embodiments include a method for implementing user-customizable operability for imaging operations in image forming devices. FIG. 5 illustrates a flowchart of such an exemplary method. As shown in FIG. 5, operation of the method commences at Step S5000 and proceeds to Step S5100.

In Step S5100, the user may be presented with a visual depiction by which the user can select an origin and axes of operation to be used in an imaging operation in an image forming device. The described visual depiction is intended to provide the user with a simple means by which to select an origin to be used for the imaging operation according to any one of known conventional means. The user may, for example, simply highlight a different corner in a depiction of an image receiving medium displayed to the user on a display device such as, for example, a GUI. It should be noted that the user may also be afforded an opportunity to select, for example, a direction of rotation for operations in the image forming device. Operation of the method proceeds to Step S5200.

In Step S5200, a user's input indicating an origin to be used in the image forming operation is obtained. The user's input may be obtained, for example, by receiving an indication via a GUI that includes a touchscreen of a user's selection based on the user interacting with a touchscreen. Other conventional methods for receiving the user indication of an origin to be used in the image forming operation, including by user interaction at a remote user workstation, are contemplated. Operation of the method proceeds to Step S5300.

In Step S5300, a mathematical representation of a coordinate space for the imaging is specified according to the user's input. This mathematical representation provides a common framework by which to define specific orientations and operations (transformations) that occur in the image forming device. Operation of the method proceeds to Step S5400.

In Step S5400, the user may be presented with a visual depiction by which the user can manipulate an order of operations to be used in an imaging operation in an image forming device. The described visual depiction is intended to provide the user with a simple means by which to modify an order of operations to be used for the imaging operation according to any one of known conventional means. The user may, for example, employ a drag-and-drop technique to modify an order of operations for the image forming device that is displayed to the user on a display device such as, for example, a GUI. Operation of the method proceeds to Step S5500.

In Step S5500, a user's input indicating a desired order of operations to be used in the image forming operation is obtained. The user's input may be obtained, for example, by receiving an indication via a GUI that includes a touchscreen of a user's selection based on the user interacting with a touchscreen. Other conventional methods for receiving the user indication of an order of operations to be used in the image forming operation, including by user interaction at a remote user workstation, are contemplated. Operation of the method proceeds to Step S5600.

In Step S5600, a mathematical representation of a composite transformation for the combination of operations in the user-specified order may be specified. This mathematical representation provides a common framework by which to define specific orientations and operations (transformations) that occur in the image forming device. Operation of the method proceeds to Step S5700.

In Step S5700, a mathematical conversion may be applied to the mathematical representation of the user-indicated origin and the user-indicated order of operations to achieve a user-intended output from the image forming device according to the user obtained inputs. In this manner, the system may effectively compute an emulation whereby to modify an input image generically in any image forming device according to the user's inputs. In embodiments, job tickets defining particular image forming tasks to be undertaken by one or more image forming devices may be modified according to the user inputs in order to produce job tickets that can be run on any image forming device according to a user's specified origin an order of operations. Operation method proceeds to Step S5800.

In Step S5800, an input image arranged according to a user-specified origin may be obtained in the image forming device. The input image may be processed according to the user-indicated origin and order of operations in a manner that produces a user desired output from the image forming device in a device agnostic manner. Operation the method proceeds to Step S5900, where operation of the method ceases.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable processing and communicating means by which to carry into effect the user-selectable operations for directing imaging operations in an image forming device for familiarity and ease of understanding.

Although not required, elements of the disclosed exemplary embodiments may be provided, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks, or implement particular data types, in support of the overall objective of the systems and methods according to this disclosure.

Those skilled in the art will appreciate that other embodiments of the disclosed subject matter may be practiced with many types of processing systems in many different configurations attached to, or otherwise associated with, a wide range of image forming devices. It should be recognized that embodiments according to this disclosure may be practiced, for example, in computing systems remote from, but in wired or wireless communication with, a particular image forming device. Preferably, however, the systems and methods according to this disclosure are incorporated in a GUI on the image forming device. Embodiments according to this disclosure may be practiced in network environments, where processing and control tasks may be performed according to instructions input at a user's workstation and/or according to predetermined schemes that may be stored in data storage devices and executed by particular processors, which may in communication with one or more image forming devices.

As indicated above, embodiments within the scope of this disclosure may also include computer-readable media having stored computer-executable instructions or data structures that can be accessed, read and executed by one or more processors. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred, or provided, over a network or via another communications connection, whether wired, wireless, or in some combination of the two, the receiving processor properly views the connection as a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents one example of a corresponding sequence of acts for implementing the functions described in the steps. The exemplary depicted steps may be executed in any reasonable order to effect the objectives of the disclosed embodiments. No particular order to the disclosed steps of the method is necessarily implied by the depiction in FIG. 5, and the accompanying description, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

I claim:

1. A method for modifying operations in an image forming device, comprising:
   obtaining, with a processor in an image forming device, an indication of a user-specified origin to be used for an imaging operation via a user interface in the image forming device, the user-specified origin defining a first coordinate system for the imaging operation;
   obtaining, with the processor in the image forming device, an indication of a user-specified order of individual component operations that collectively constitute the imaging operation in the image forming device via the user interface;
   identifying, with the processor in the image forming device, a transformation operation for converting the first coordinate system to a second coordinate system, the second coordinate system being used by hardware components in the image forming device for executing the imaging operation;
   receiving, with the processor in the image forming device, input image data according to the user-specified origin in the first coordinate system;
   applying, with the processor in the image forming device, the identified transformation operation to the input image data to transform the input image data in the first coordinate system to image data in the second coordinate system; and
   directing, with the processor in the image forming device, processing of the image data in the second coordinate system and according to the user-specified order of individual component operations for the imaging operation in the image forming device,
   the image forming device outputting a result of the imaging operation.

2. The method of claim 1, further comprising:
   presenting to a user a visual graphical display identifying a current origin for the imaging operation in the image forming device; and
   obtaining the indication of the user-specified origin for the imaging operation based on user interaction with the user interface associated with the visual graphic display by which the user identifies the user-specified origin.

3. The method of claim 2, the visual graphic display being presented to the user on at least one of a graphical user interface of the image forming device and a display device of a separate user workstation associated with the image forming device.

4. The method of claim 2, the user interaction with the user interface including indicating the user-specified origin on the visual graphical display by at least one of (1) positioning a cursor over a particular portion of the visual graphic display and clicking on the particular portion of the visual graphic display presented on an interactive display device and (2) touching the particular portion of the visual graphic display presented on a touchscreen display device.

5. The method of claim 1, further comprising:
presenting to a user a plurality of the individual component operations comprising a current order of the individual component operations for the imaging operation in the image forming device; and
obtaining the indication of the user-specified origin for the imaging operation based on user interaction with the user interface and the visual graphic display by which the user reorders the presented plurality of the individual component operations to obtain the user-specified order of individual component operations.

6. The method of claim 5, the visual graphic display being presented to the user on at least one of a graphical user interface of the image forming device and a display device of a separate user workstation associated with the image forming device.

7. The method of claim 6, the visual graphic display presenting elements on a single display screen by which the user can indicate both of the user-specified origin and the user-specified order of individual component operations for the imaging operation.

8. The method of claim 5, the user interaction with the user interface and the visual graphic display including indicating the user-specified order of individual component operations by dragging-and-dropping at least one of the plurality of individual component operations to a different position in the current order of individual component operations in order to indicate the user-specified order of individual component operations.

9. The method of claim 1, the identified transformation operation being applied to modify a plurality of job tickets identifying a plurality of imaging operations to be executed by the image forming device.

10. The method of claim 9, the plurality of job tickets being further modified to include the user-specified order of individual component operations for each of the plurality of imaging operations to be executed by the image forming device.

11. A system for modifying operations in an image forming device, comprising:
a display device that displays a visual graphical display identifying at least a current origin for an imaging operation and a current order of individual component operations constituting the imaging operation in an image forming device;
a user interface by which a user inputs (1) an indication of a user-specified origin for the imaging operation, the user-specified origin defining a first coordinate system for the imaging operation, and (2) an indication of a user-specified order of individual component operations to be used for the imaging operation;
a processor that is programmed to
identify a transformation operation for converting the first coordinate system to a second coordinate system, the second coordinate system being used by hardware components in the image forming device for the imaging operation,
receive input image data according to the user-specified origin in the first coordinate system,
apply the identified transformation operation to the input image data to transform the input image data in the first coordinate system to image data in the second coordinate system; and
direct processing of the image data in the second coordinate system and according to the user-specified order of individual component operations for the imaging operation in the image forming device,
the image forming device outputting a result of the imaging operation.

12. The system of claim 11, the display device and the user interface being components of a graphical user interface of the image forming device.

13. The system of claim 11, the display device and the user interface being components of a separate user workstation associated with the image forming device.

14. The system of claim 11, the processor being further programmed to modify a plurality of job tickets identifying a plurality of imaging operations to be executed by the image forming device by applying the identified transformation operation to the plurality of imaging operations to be executed by the image forming device identified by the plurality of job tickets.

15. The system of claim 14, the processor being further programmed to modify the plurality of job tickets to include the user-specified order of individual component operations for each of the plurality of imaging operations to be executed by the image forming device.

16. A non-transitory computer-readable medium storing instructions which, when executed by a processor, cause the processor to execute the steps of a method comprising:
obtaining an indication of a user-specified origin to be used for an imaging operation via a user interface in the image forming device, the user-specified origin defining a first coordinate system for the imaging operation;
obtaining an indication of a user-specified order of individual component operations that collectively constitute the imaging operation in the image forming device via the user interface;
identifying a transformation operation for converting the first coordinate system to a second coordinate system, the second coordinate system being used by hardware components in the image forming device for executing the imaging operation;
receiving input image data according to the user-specified origin in the first coordinate system;
applying the identified transformation operation to the input image data to transform the input image data in the first coordinate system to image data in the second coordinate system; and
directing processing of the image data in the second coordinate system and according to the user-specified order of individual component operations for the imaging operation in the image forming device,
the image forming device outputting a result of the imaging operation.

* * * * *